(12) United States Patent
Rysgaard et al.

(10) Patent No.: US 6,193,062 B1
(45) Date of Patent: Feb. 27, 2001

(54) TACKLE BOX

(76) Inventors: Robert Rysgaard, 4322 Shoreline Dr., Robbinsdale, MN (US) 55422; Clayton Scheuer, 1713 Van Buren St. NE., Blaine, MN (US) 55434

( * ) Notice: Subject to any disclaimer, the term of this patent is extended or adjusted under 35 U.S.C. 154(b) by 0 days.

(21) Appl. No.: 09/388,959

(22) Filed: Sep. 2, 1999

(51) Int. Cl.⁷ .................................................. B65D 85/00
(52) U.S. Cl. ................ 206/315.11; 206/373; 206/459.1; 220/23.83; 43/54.1; 312/902
(58) Field of Search .................... 206/315.11, 315.1, 206/373, 216, 579, 459.1; 220/4.27, 4.28, 23.83, 23.6, 763, 775; 43/54.1, 77.5; 70/63; 312/902, 345.6, 244, 223.5, 111, 290, 244.11; 362/254, 156; 224/920

(56) References Cited

U.S. PATENT DOCUMENTS

| | | | |
|---|---|---|---|
| 3,098,686 | * | 7/1963 | Benoit ............................... 312/348.6 |
| 4,391,478 | * | 7/1983 | Grunert ............................ 312/348.6 |
| 4,452,003 | * | 6/1984 | Deutsch et al. ................. 206/315.11 |
| 4,662,515 | * | 5/1987 | Newby, Sr. .......................... 206/349 |
| 4,768,651 | * | 9/1988 | Lanius .............................. 206/315.11 |
| 4,901,664 | * | 2/1990 | Labrecque ............................ 206/573 |
| 5,176,281 | * | 1/1993 | Fiore ................................. 220/23.86 |
| 5,244,265 | * | 9/1993 | Chiang ................................. 312/902 |
| 5,344,339 | * | 9/1994 | Cheslock .............................. 206/372 |
| 5,624,029 | * | 4/1997 | Shih .................................... 206/372 |
| 5,685,421 | * | 11/1997 | Gilmore .............................. 206/216 |
| 5,699,925 | * | 12/1997 | Petruzzi ............................. 220/4.27 |
| 5,938,023 | * | 8/1999 | Herron et al. .................. 206/315.11 |

* cited by examiner

Primary Examiner—Paul T. Sewell
Assistant Examiner—Shian Luong

(57) ABSTRACT

A tackle box for storing items, such as fishing tackle, in an organized manner. The tackle box includes a base container with a front panel having a plurality of slidably mounted drawers. The bottom of a top container is detachably attached to a top panel of the base container. The top container has a bottom portion and upper lid portion pivotally coupled to the bottom portion of the top container. The top of the top container has a depression therein defining an upper compartment. A generally transparent window substantially covers the upper compartment of the top of the top container. The top of the top container also has a handler pivotally coupled thereto.

8 Claims, 3 Drawing Sheets

TACKLE BOX

BACKGROUND OF THE INVENTION

1. Field of the Invention

The present invention relates to tackle boxes and more particularly pertains to a new tackle box for storing items, such as fishing tackle, in an organized manner.

2. Description of the Prior Art

The use of tackle boxes is known in the prior art. More specifically, tackle boxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,958,730; U.S. Pat. No. 4,555,862; U.S. Pat. No. Des. 318,175; U.S. Pat. No. 4,541,539; U.S. Pat. No. 4,271,624; and U.S. Pat. No. 3,991,922.

While these devices fulfill their respective, particular objectives and requirements, the aforementioned patents do not disclose a new tackle box. The inventive device includes a base container with a front panel having a plurality of slidably mounted drawers. The bottom of a top container is detachably attached to a top panel of the base container. The top container has a bottom portion and upper lid portion pivotally coupled to the bottom portion of the top container. The top of the top container has a depression therein defining an upper compartment. A generally transparent window substantially covers the upper compartment of the top of the top container. The top of the top container also has a handle pivotally coupled thereto.

In these respects, the tackle box according to the present invention substantially departs from the conventional concepts and designs of the prior art, and in so doing provides an apparatus primarily developed for the purpose of storing items, such as fishing tackle, in an organized manner.

SUMMARY OF THE INVENTION

In view of the foregoing disadvantages inherent in the known types of tackle boxes now present in the prior art, the present invention provides a new tackle box construction wherein the same can be utilized for storing items, such as fishing tackle, in an organized manner.

The general purpose of the present invention, which will be described subsequently in greater detail, is to provide a new tackle box apparatus and method which has many of the advantages of the tackle boxes mentioned heretofore and many novel features that result in a new tackle box which is not anticipated, rendered obvious, suggested, or even implied by any of the prior art tackle box, either alone or in any combination thereof.

To attain this, the present invention generally comprises a base container with a front panel having a plurality of slidably mounted drawers. The bottom of a top container is detachably attached to a top panel of the base container. The top container has a bottom portion and upper lid portion pivotally coupled to the bottom portion of the top container. The top of the top container has a depression therein defining an upper compartment. A generally transparent window substantially covers the upper compartment of the top of the top container. The top of the top container also has a handle pivotally coupled thereto.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structure, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tackle box apparatus and method which has many of the advantages of the tackle boxes mentioned heretofore and many novel features that result in a new tackle box which is not anticipated, rendered obvious, suggested, or even implied by any of the prior art tackle boxes, either alone or in any combination thereof.

It is another object of the present invention to provide a new tackle box which may be easily and efficiently manufactured and marketed.

It is a further object of the present invention to provide a new tackle box which is a durable and reliable construction.

An even further object of the present invention is to provide a new tackle box which is susceptible of a low cost of manufacture with regard to both materials and labor, and which accordingly is then susceptible of low prices of sale to the consuming public, thereby making such tackle box economically available to the buying public.

Still yet another object of the present invention is to provide a new tackle box which provides in the apparatuses and methods of the prior art some of the advantages thereof, while simultaneously overcoming some of the disadvantages normally associated therewith.

Still another object of the present invention is to provide a new tackle box for storing items, such as fishing tackle, in an organized manner.

Yet another object of the present invention is to provide a new tackle box which includes a base container with a front panel having a plurality of slidably mounted drawers. The bottom of a top container is detachably attached to a top panel of the base container. The top container has a bottom portion and upper lid portion pivotally coupled to the bottom portion of the top container. The top of the top container has a depression therein defining an upper compartment. A generally transparent window substantially covers the upper compartment of the top of the top container. The top of the top container also has a handle pivotally coupled thereto.

Still yet another object of the present invention is to provide a new tackle box that may be used to store and organize hunting gear, photography gear and even hobby tools therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
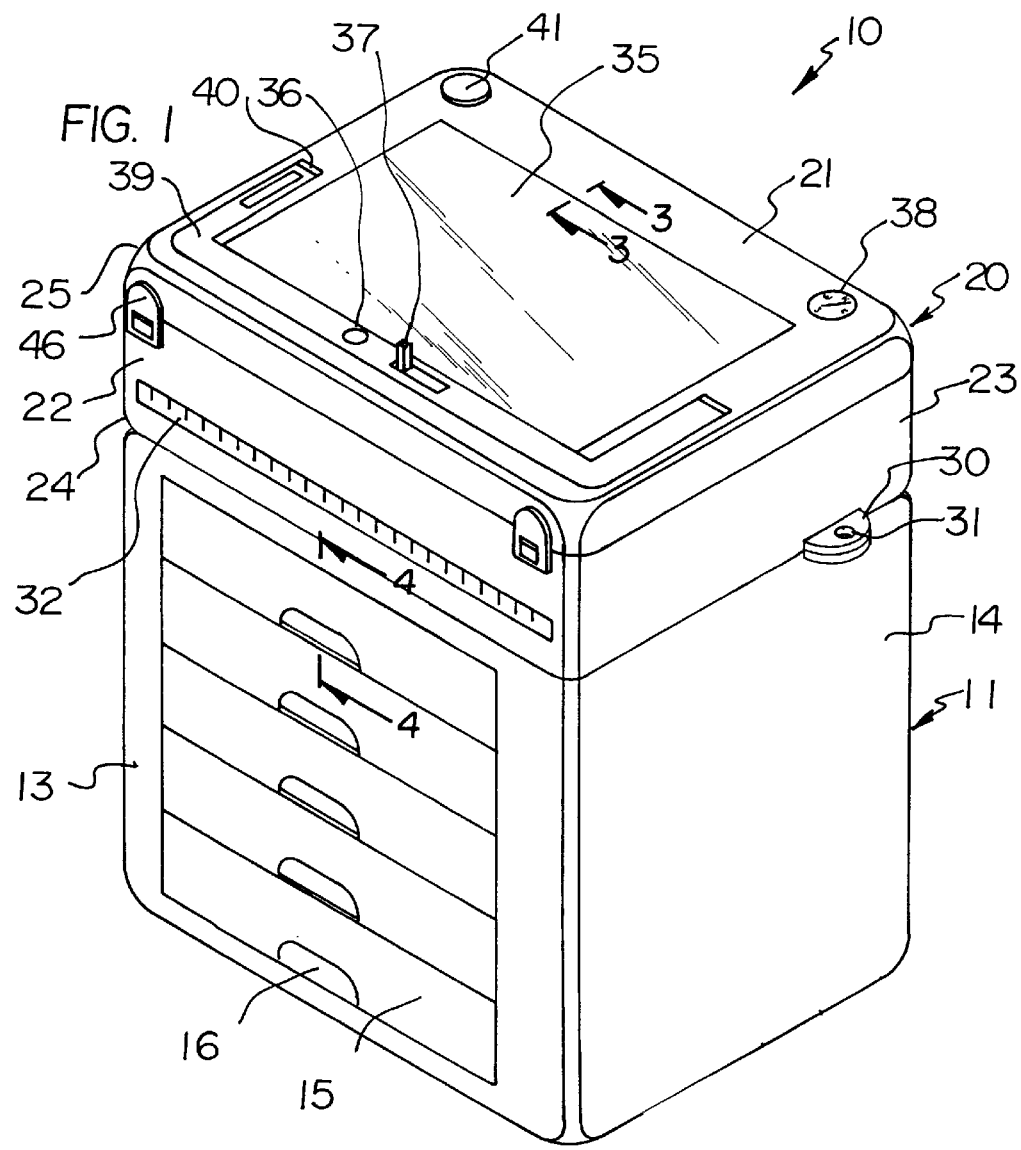
FIG. 1 is a schematic perspecitive view of a new tackle box according to the present invention.
Figure 2:
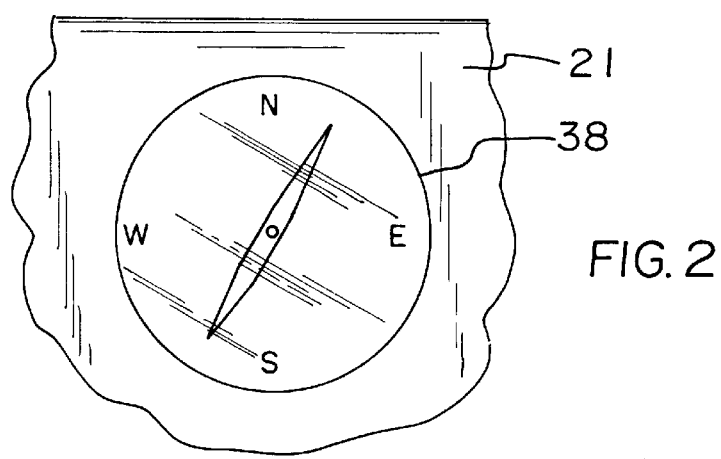
FIG. 2 is a schematic enlarged view of the magnetic compass of the top of the top container of the present invention.
Figure 3:
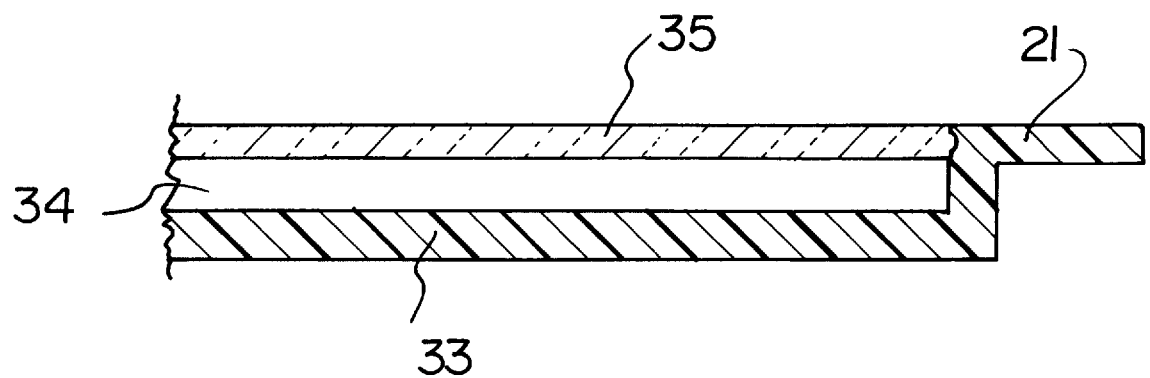
FIG. 3 is a schematic cross sectional view of the upper compartment taken from line 3—3 of FIG. 1.

With reference now to the drawings, and in particular to FIGS. 1 through 7 thereof, a new tackle box embodying the principles and concepts of the present invention and generally designated by the reference numeral 10 will be described.

As best illustrated in FIGS. 1 through 7, the tackle box 10 generally comprises a base container with a front panel having a plurality of slidably mounted drawers. The bottom of a top container is detachably attached to a top panel of the base container. The top container has a bottom portion and upper lid portion pivotally coupled to the bottom portion of the top container. The top of the top container has a depression therein defining an upper compartment. A generally transparent window substantially covers the upper compartment of the top of the top container. The top of the top container also has a handle pivotally coupled thereto.

In closer detail, the tackle box 10 comprises a generally rectangular box-shaped base container has substantially planar top, bottom, front, back and a pair of side panels. Preferably, the base container has rounded corner edges between the front, back, and side panels of the base container. In the preferred embodiment, the top and bottom panels of the base container lie in substantially parallel planes to one another. In this preferred embodiment, the front and back panels of the base container lie in substantially parallel planes to one another substantially perpendicular to the planes of the top and bottom panels of the base container. The side panels of the base container also preferably lie in substantially parallel planes to one another substantially perpendicular to the planes of the top and bottom panels of the base container and substantially prependicular to the front and back panels of the base container.

Figure 4:
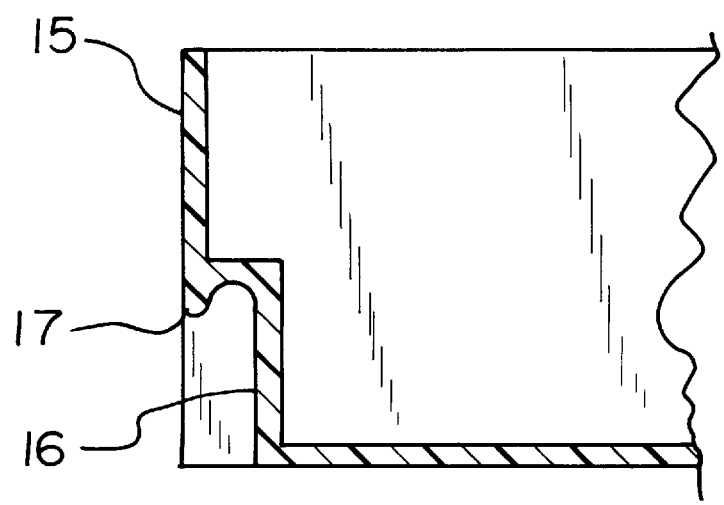
FIG. 4 is a schematic cross sectional view of a drawer taken from line 4—4 of FIG. 1.
Figure 5:
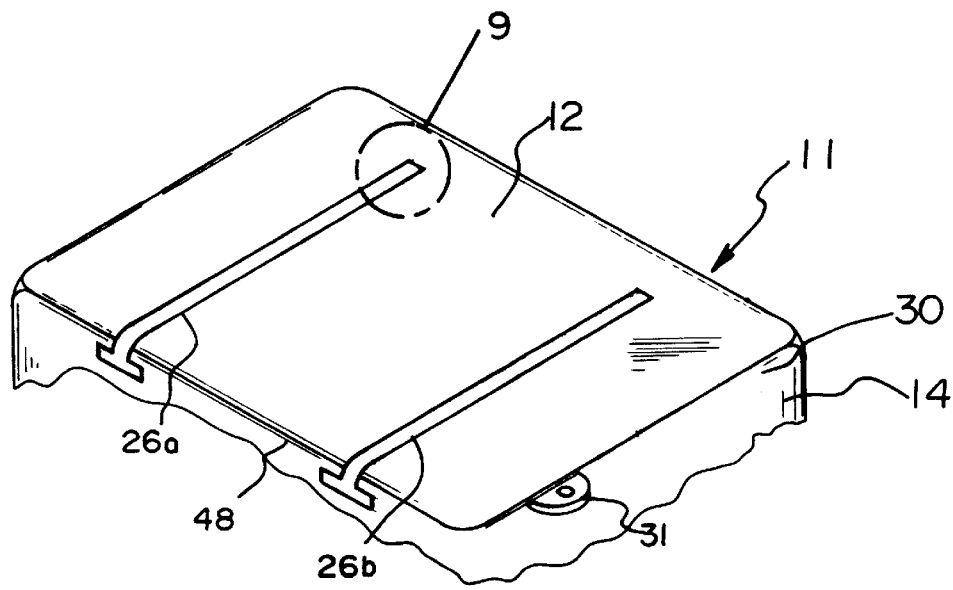
FIG. 5 is a schematic partial perspective view of the top panel of the base container looking from the back of the base container.
Figure 6:
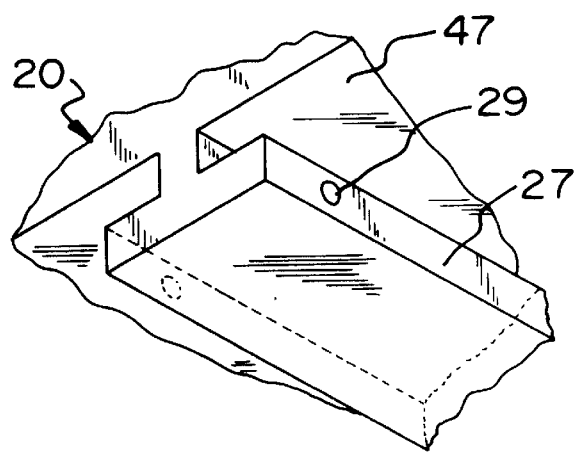
FIG. 6 is a schematic partial perspective view of the bottom of the top container.
Figure 7:
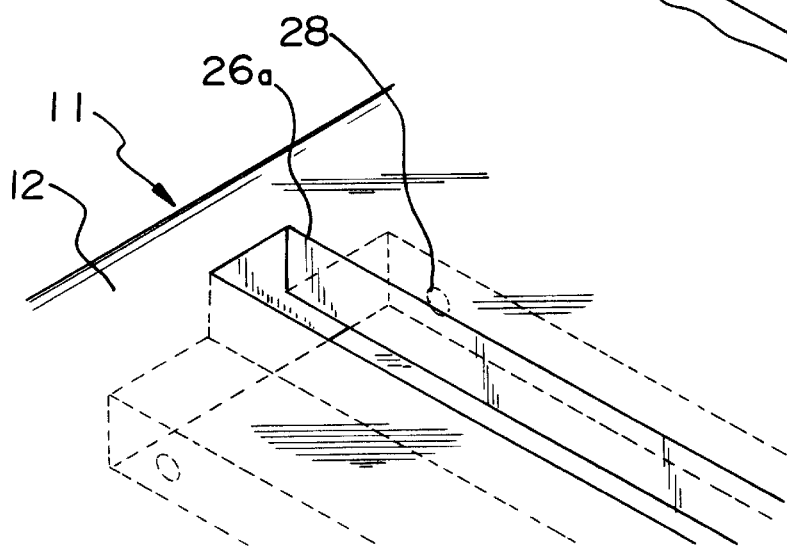
FIG. 7 is a schematic enlarged perspective view of the elongate channel taken from the circle 9 of FIG. 5.

The front panel 13 of the base container has a plurality of slidably mounted drawers 15. The drawers are arranged in a stack extending between the top and bottom panels of the base container. In use, the drawers of the front panel of the base containers are designed for storing and organizing items therein. Each of the drawers of the front panel of the base container preferably has a recessed handle 16 in a front face of the respective drawer therein. As illustrated in FIG. 4, each recessed handle of the drawers has a downwardly depending finger lip 17 designed for permitting the fingertips of a user to pull the respective drawer open.

The generally rectangular box-shaped top container 20 has a top 21, a bottom, a front 22, a back, and a pair of sides, a bottom portion 24 and upper lid portion 25 pivotally coupled to the bottom portion of the top container at the back of the top container. In use, the top container is designed for storing and organizing items in the bottom portion of the top container while the upper lid portion is designed for covering the bottom portion of the top container. Preferably, the top container has a pair of latches 46 detachably attaching the bottom portion and the upper lid portion together. The latches of the top container are positioned on the front of the top container.

Preferably, the top and bottom of the top container lie in substantially parallel planes to one another. The front and back of the top container also preferably lie in substantially parallel planes to one another substantially perpendicular to the planes of the top and bottom of the top container. In this preferred embodiment, the sides of the top container lie in substantially parallel planes to one another substantially perpendicular to the planes of the top and bottom of the top container and substantially perpendicular to the front and back of the top container.

The bottom of the top container is detachably attached to the top panel 12 of the base container. In closer detail, as illustrated in FIGS. 1, 5, 6, and 7, the bottom of the top container is rested on the top panel of the base container. The top panel of the base container has a pair of elongate channels 26a, 26b extending from the back panel 48 of the base container towards the front panel of the base container. The elongate channels of the top panel of the base container each are preferably extended substantially parallel to the side panels of the base container and substantially perpendicular to the front and back panels of the base container. Correspondingly, the bottom 47 of the top container has a pair of elongate ridges 27 extending from the back of the top container towards the front of the top container. The elongate ridges of the bottom of the top container are preferably extended substantially parallel to the sides of the top container and substantially perpendicular to the front and back of the top container. Each of the elongate ridges of the bottom of the top container is slidably inserted into the associated elongate ridge of the top panel of the base container. The elongate channels of the top panel of the base container and the elongate ridges of the bottom of the top container are of complementary cooperating transverse cross section preventing lifting of the top container from the base container without relative sliding motion therebetween. Ideally, the transverse cross sections of the elongate channels and the elongate ridges are each generally T-shaped.

Preferably, the elongate channels of the top panel of the base container each have a generally hemispherical dimple therein 28. The dimple of the elongate channels are preferably positioned towards the other side panel of the base container. The elongate ridges of the bottom of the top container each have a generally hemispherical resilient protrusion 29 outwardly extending therefrom. Preferably, the resilient protrusion of the elongate ridges are positioned towards the other side of the top container. The resilient protrusion of the elongate ridges are inserted into the dimple of the elongate channels to releasably hold the elongate ridges against sliding in the elongate channels unless a sliding force greater than a predetermined amount of force is applied to slide the elongate ridges in the elongate channels.

Ideally, the one side panel 14 of the base container and the one side 23 of the top container each have an outwardly extending securing tab 30. Each of the securing tabs has a generally circular hole 31 therethrough. The holes of the securing tabs are substantially coaxial with one another to permit extension of bolt of a padlock therethrough to lock the top and bottom containers together.

Preferably, the top container is aligned on the base container such that the front of the top container and the front panel of the base container is generally coplaner with one another and the back of the top container and the back panel of the base container are generally coplaner with one another. Also preferably, the one side of the top container and the one side panel of the base container are generally coplaner with one another and the other side of the top container and the other side panel of the base containers are generally coplaner with one another.

As illustrated in FIG. 1, the front of the top container has a measuring scale 32 thereon. The measuring scale is preferably extended generally parallel to the top and bottom of the top container. In use, the measuring scale is designed for measuring items such as fish and game.

The top of the top container has a centrally positioned generally rectangular depression 33 therein defining an upper compartment 34. The upper compartment of the top of the top container is designed for holding maps and charts therein. The top container has a generally transparent and generally rectangular window 35 substantially covering the upper compartment of the top of the top container. In use, the window of the top container is designed for protecting maps and charts in the upper compartment from wetting and soiling while still permitting viewing of the maps and charts in the upper compartment.

Preferably, the top of the top container also has a light source 36 for providing light to the area around the top of the top container. The light source has a switch 37 electrically connected thereto for selectively energinizing the light source. The switch is also preferably provided on the top of the top container.

Ideally, a measuring tape 41 is coupled to the top of the top container.

The top of the top container preferably has a magnetic compass 38 mounted thereto. The magnetic compass and the window of the top container ideally lie in a common plane flush with the top of the top container.

The top of the top container has a generally rectangular U-shaped handle 39 pivotally coupled thereto. Preferably, the top of the top container has a generally rectangular U-shaped recess 40 therein receiving the handle.

In an ideal illustrative embodiment the tackle box has a height defined between the top of the top container and the bottom panel of the base container of about 28 inches, a width defined between the side panels of the base container of about 22 inches, and a depth defined between the front and back panels of the base container between about 18 inches and about 20 inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A tackle box system, comprising:

a base container having a top panel, a bottom panel, a front panel, a back panel and a pair of side panels;

a plurality of slidably mounted drawers mounted in said base container;

a top container having a top, a bottom, a front, a back, and a pair of sides, said top container having a bottom portion with said bottom thereon and an upper lid portion with said top thereon, said upper lid portion of said top container being pivotally coupled to said bottom portion of said top container;

said bottom of said top container being detachably attached to said top panel of said base container;

said top of said top contaienr having a depression therein defining an upper compartment;

said top container having a generally transparent window mounted on said top of said top container; and said top of said top container having a handle pivotally coupled thereto;

wherein said bottom of said top container is restable on said top panel of said base container, wherein said top panel of said base container has an elongate channel extending from said back panel of said base container towards the front panel of said base container, wherein said bottom of said top container has an elongate ridge extending from said back of said top container towards said front of said top container, and wherein said elongate ridge of said bottom of said top container is slidably inserted into said elongate channel of said top panel of said base container;

wherein a first surface of said elongate channel of said top panel of said base container has a dimple extending into said first surface of said elongate channel, wherein a second surface of said elongate ridge of said bottom of said top container has a resilient protrusion protruding outwardly from said second surface of said elongate ridge, and wherein said resilient protrusion of said elongate ridge is positioned in said dimple of said elongate channel when said elongate ridge is fully inserted into said elongate channel to releasably hold said elongate ridge against sliding out of said elongate channel.

2. The tackle box system of claim 1, wherein each of said drawers of said base container has a recessed handle therein, and wherein each said recessed handle of said drawers has a downwardly depending finger lip.

3. The tackle box system of claim 1, wherein said top container having a pair of latches detachably attaching said bottom portion and said upper lid portion together.

4. The tackle box system of claim 1, wherein said elongate ridge of said bottom of said top container is removably received in said elongate channel of said top panel of said base container for preventing lifting of said top container from said base container without relative sliding motion therebetween.

5. The tackle box system of claim 1, wherein said front of said top container has a measuring scale thereon, said measuring scale having a length extending generally parallel to said top and bottom of said top container, wherein said top of said top container has a light source, said light source having a switch electrically connected thereto, said switch being provided on said top of said top container, and wherein said top of said top container has a magnetic compass mounted thereto.

6. The system of claim 1 wherein said tackle box has a height defined between said top of said top container and said bottom panel of said base container of about 28 inches, a width defined between said side panels of said base container of about 22 inches, and a depth defined between said front and back panels of said base container between about 18 inches and about 20 inches.

7. A tackle box system, comprising:

a generally rectangular box-shaped base container having a substantially planer top panel, bottom panel, front panel, back panel and a pair of side panels, wherein said base container has rounded corner edges between said front panel, said back panel, and said side panels of said base container;

said top and bottom panels of said base container lying in substantially parallel planes to one another, said front and back panels of said base container lying in substantially parallel planes to one another and substantially perpendicular to said planes of said top and bottom panels of said base container, said side panels of said base container lying in substantially parallel planes to one another substantially perpendicular to said planes of said top and bottom panels of said base container and substantially perpendicular to said front and back panels of said base container;

a plurality of slidably mounted drawers mounted on said base container and being extendable through said front panel, said drawers being arranged in a stack extending between said top and bottom panels of said base container;

each of said drawers of said front panel of said base container having a recessed handle therein, each said recessed handle of said drawers having a downwardly depending finger lip;

a generally rectangular box-shaped top container having a top, a bottom, a front, a back, and a pair of sides, said top container having a bottom portion with said bottom thereon and an upper lid portion with said top thereon, said upper lid portion of said top container being pivotally coupled to said bottom portion of said top container at said back of said top container;

said top conainer having a pair of latches detachably attaching said bottom portion and said upper lid portion together, said latches of said top container being positoned on said front of said top container;

said top and bottom of said top container lying in substantially parallel planes to one another, said front and back of said top container lying in substantially parallel planes to one another substantially perpendicular to said planes of said top and bottom of said top container, said sides of said top container lying in substantially parallel planes to one another substantially perpendicular to said planes of said top and bottom of said top container and substantially perpendicular to said front and back of said top container;

said bottom of said top container being rested on said top panel of said base container;

said top panel of said base container having an elongate channel extending from said back panel of said base container towards said front panel of said base container;

said elongate channel of said top panel of said base container being extended substantially parallel to said side panels of said base container and substantially perpendicular to said front and back panels of said base container;

said bottom of said top container having an elongate ridge extending from said back of said top container towards the front of said top container;

said elongate ridge of said bottom of said top container being extended substantially parallel to said sides of said top container and substantially pependicular to said front and back of said top container;

said elongate ridge of said bottom of said top container being slidably inserted into said elongate channel of said top panel of said base container;

wherein said elongate ridge of said bottom of said top container is removably received in said elongate channel of said top panel of said base container for preventing lifting of said top container from said base container without relative sliding motion therebetween;

wherein said transverse cross sections of said elongate channel and said elongate ridges are each generally T-shaped;

wherein a first surface of said elongate channel of said top panel of said base container has a generally hemispherical dimple extending into said first surface of said elongate channel, wherein a second surface of said elongate ridge of said bottom of said top container has a generally hemispherical resilient protrusion protruding outwardly from said second surface of said elongate ridge, and wherein said resilient protrusion of said elongate ridge is positioned is said dimple of said elongate channel when said elongate ridge is fully inserted into said elongate channel to releasably hold said elongate ridge against sliding out of said elongate channel unless a sliding force greater than a predetermined amount of force is applied to slide the elongate ridge in the elongate channel;

said one side panel of said base container and said one side of said top container each having an outwardly extending securing tab, each of said securing tabs having a generally circular hole therethrough, said holes of said securing tabs being subsantially coaxial with one another;

said front of said top container and said front panel of said base container being generally coplanar with one another, said back of said top container and said back panel of said base container being generally coplanar with one another, a first one of said sides of said top container and a first one of said side panels of said base container being generally coplanar with one another, and a second one of said sides of said top container and a second one of said side panels of said base container being generally coplanar with one another, said front of said top container having a measuring scale thereon, said measuring scale having a length extending generally parallel to said top and bottom of said top container;

said top of said top container having a centrally positioned generally rectangular depression therein defining an upper compartment;

said top container having a generally transparent and generally rectangular window mounted on said top of said top container;

said top of said top container having a light source, said light source having a switch electrically connected thereto, said switch being provided on said top of said top container;

said top of said top container having a magnetic compass mounted thereto;

said magnetic compass and said window of said top container lying in a common plane with said of said top container;

said top of said top container having a generally rectangular U-shaped handle pivotally coupled thereto;

said top of said container having a generally rectangular U-shaped recess therein receiving said handle.

8. The system of claim 7 wherein said tackle box has a height defined between said top of said top container and said bottom panel of said base container of about 28 inches, a width defined between said side panels of said base container of about 22 inches, and a depth defined between said front and back panels of said base container between about 18 inches and about 20 inches.

\* \* \* \* \*